United States Patent [19]

Friggstad

[11] 4,373,455

[45] Feb. 15, 1983

[54] SEED BOOT ASSEMBLY

[75] Inventor: Terrance Friggstad, Frontier, Canada

[73] Assignee: Friggstad Manufacturing Ltd., Frontier, Canada

[21] Appl. No.: 271,777

[22] Filed: Jun. 8, 1981

[51] Int. Cl.³ .............................................. A01C 5/00
[52] U.S. Cl. .................................................... 111/86
[58] Field of Search ...................... 111/6, 7, 73, 80, 85, 111/86; 222/564, 572, 574, 575, 137; 406/154, 191, 195

[56] References Cited

U.S. PATENT DOCUMENTS

| | | | |
|---|---|---|---|
| 363,606 | 5/1887 | Crane | 111/86 |
| 910,192 | 1/1909 | Grouvelle et al. | 406/191 X |
| 1,123,325 | 1/1915 | Leavelle | 111/73 |
| 1,934,490 | 11/1933 | Elliott | 111/86 |
| 3,159,312 | 12/1964 | Van Sciver | 222/575 X |

FOREIGN PATENT DOCUMENTS

| | | | |
|---|---|---|---|
| 148485 | 4/1951 | Australia | 111/80 |
| 636735 | 2/1962 | Canada | 111/86 |
| 1091101 | 12/1980 | Canada | 111/86 |
| 95529 | 4/1939 | Sweden | 111/86 |
| 197710 | 10/1977 | U.S.S.R. | 111/86 |

Primary Examiner—James R. Feyrer
Attorney, Agent, or Firm—Stanley G. Ade

[57] ABSTRACT

A seed boot for pneumatic seeder or fertilizer assemblies includes a seed or fertilizer tube having an attaching bolt extending therethrough adjacent the base thereof and just above the splitting or separating saddle. A forwardly extending crease is formed within the rear of the tube and extends into the tube above the bolt thus dividing the seed and/or fertilizer into two equal streams which clear the bolt and then engage the saddle well down the sides thereof so that the seed and/or fertilizer is deflected outwardly under the wings of the sweep thus reducing the possibility of the seed and/or fertilizer from bouncing up into loose soil and therefore being wasted.

18 Claims, 2 Drawing Figures

SEED BOOT ASSEMBLY

BACKGROUND OF THE INVENTION

This invention relates to new and useful improvements in seed or fertilizer tube assemblies designed specifically for use with pneumatic seeding and/or fertilizing devices in which the seed and/or granular fertilizer is entrained within an airstream and ejected rearwardly of the sweep with considerable force.

Conventionally, a dividing saddle is situated just rearwardly of the sweep and below the outlet of the seed and/or fertilizer tube, to spread the granular material outwardly into the furrow formed by the sweep. Unfortunately, the considerable force imparted to the material due to the airstream carrying same, often causes the material to bounce from the outwardly and downwardly sloping sides of the saddle, upwardly therefrom and clear of the wings of the sweep to be deposited in the loose soil on the surface of the ground and therefore wasting the seed and/or fertilizer.

This fault is accentuated by the provision of the conventional securing bolt assembly, securing the boot adjacent the lower end thereof to the rear of the sweep shank, said bolt assembly passing through the tube or boot thus upsetting the grain or fertilizer flow and accentuating the fault hereinbefore described due to the excessive turbulence caused by the seed and/or granular fertilizer striking the diametrically extending bolt assembly.

SUMMARY OF THE INVENTION

The present invention overcomes these disadvantages by dividing the seed and/or fertilizer within the tube, prior to its reaching the bolt assembly so that the two streams clear the bolt assembly and therefore strike the dividing saddle further down the outwardly and downwardly sloping sides and thereby ensuring that the majority of the seed kernels and/or granular fertilizer receive outward deflection under the wings of the sweep so that it is retained within the furrow formed by the wings of the sweep.

In accordance with one embodiment of the invention there is provided a seed and/or fertilizer applicating boot assembly for use in conjunction with a sweep secured to a downwardly depending sweep shank and including a securing bolt assembly extending diametrically through said tube from the front to the rear thereof and through the shank to secure said tube to said shank; comprising in combination substantially vertical tube operatively connected to a source of grain and/or fertilizer entrained in an airstream, means in said tube to divide the stream of grain and/or fertilizer into two streams, one at each side of the tube, said means extending along the vertical length of part of said tube.

In another embodiment of the invention there is provided a sweep assembly secured to the lower end of a sweep shank comprising in combination a pair of wings extending outwardly from adjacent the lower end of said shank, means securing said sweep assembly to said shank, a seed and/or fertilizer boot assembly, bolt means securing same to the rear of said shank, said boot assembly terminating spaced above said sweep assembly, a dividing saddle secured to said shank immediately below the lower end of said boot assembly, said boot assembly including a substantially vertical tube operatively connected to a source of grain and/or fertilizer entrained in an airstream, means in said tube to divide the stream of grain and/or fertilizer into two streams, one at each side of the tube, said means extending along the vertical length of part of said tube.

Another advantage of the invention is that same is applicable to any pneumatic assembly whether it carries seed alone, granular fertilizer alone or a mixture of the two or in fact any granular material which may be required to be deposited within the furrow formed by the sweep.

Another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 3 is a section of the boot per se substantially along the lines 3—3 of FIG. 1.

FIG. 4 is a section of the boot per se, substantially along the line 4—4 of FIG. 1.

In the drawings like characters of reference indicate corresponding parts in the different figures.

DETAILED DESCRIPTION

Figure 1:
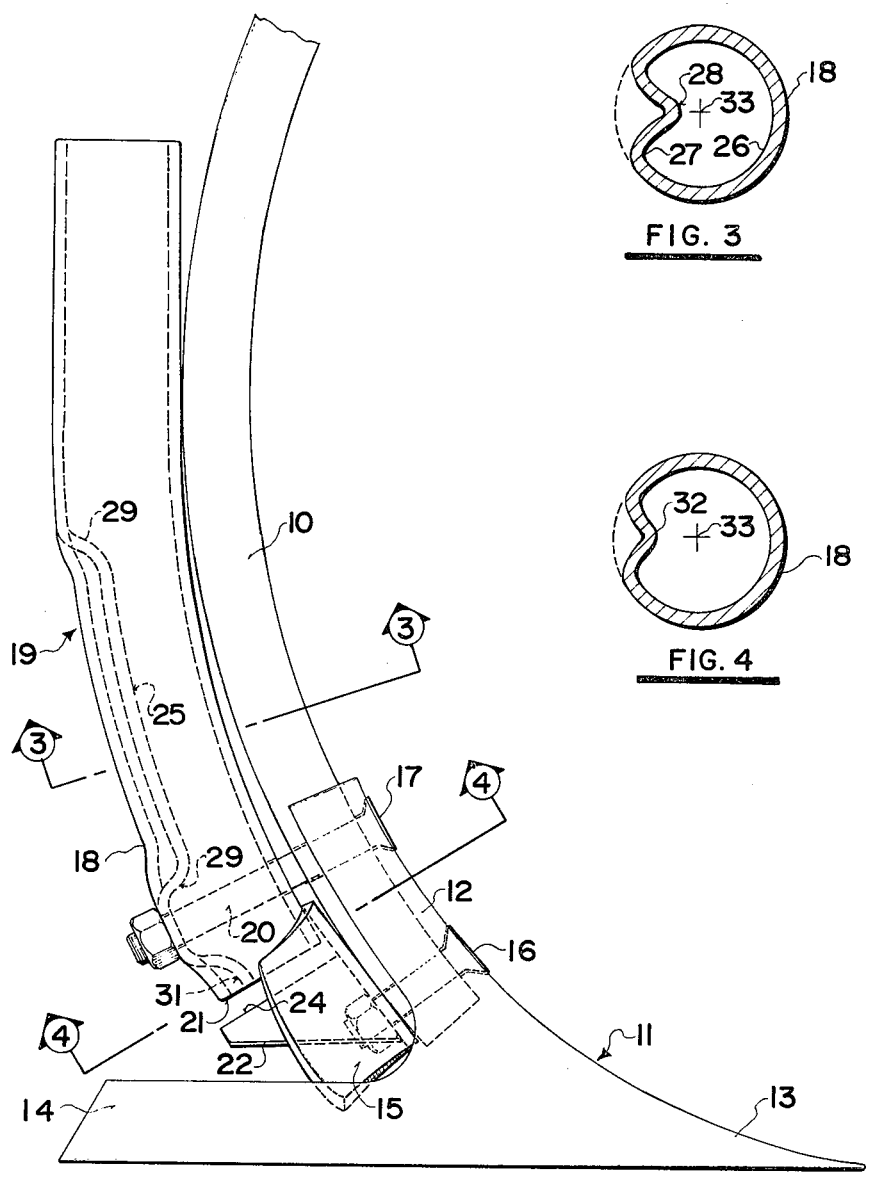
FIG. 1 is a side elevation of a sweep assembly with the seed and/or fertilizer boot secured to the rear side thereof.

Proceeding therefore to describe the invention in detail, reference character 10 illustrates a conventional sweep shank normally depending from supporting structure (not illustrated) of an assembly designed to open furrows and the like and to deposit seed and/or fertilizer or any other granular material in the furrow opened.

A furrow opener is secured to the lower end of the shank 10 taking the form of a winged sweep collectively designated 11 and including the upwardly extending circular channel portion 12 engaging over the front and sides of the sweep 10, the forwardly extending pointed sweep portion 13, and the outwardly and rearwardly diverging wings 14 with subsidiary wings 15 being secured above the wings 14 and to the rear of the shank 10, by means of the securing nut and bolt assembly 16 which extends through the portion 12, through the lower end of the shank 10 and through the subsidiary wings 15, all of which is conventional.

A further nut and bolt assembly 17 is provided extending through the upper end of the portion 12 and through the shank 10 and this secures the lower end 18 of a seed bolt or tube component collectively designated 19 with the shank 20 of the bolt extending diametrically through adjacent the lower discharge end 21 of the seed boot or tube.

This tube extends upwardly along the rear side of the shank 10 and is operatively connected to a conventional pneumatic seeding device (not illustrated) and carries grain and/or granular fertilizer and/or any other granular material entrained within an airstream, downwardly to the rear of the sweep 11 and between the wings 14 thereof.

Supported at the rear of the shank 10 and immediately below the discharge 21 of the tube, is a dividing saddle 22 preferably secured by means of the nut and bolt assembly 16 and this dividing channel includes the outwardly and downwardly diverging wings 23 with the apex 24 being substantially in alignment with the fore and aft axis of the tube 19. Under normal circumstances, the entrained material is given turbulence and partial division as it strikes the diametrically situated bolt shank 20 and then strikes the sides of the saddle adjacent the apex 24 thereof and is thus deflected across the width of the furrow formed by the sweep 11.

Unfortunately, the bolt shank 20 tends to cause the entrained material to loose speed and to be directed onto the triangular split or saddle 22 in a somewhat random manner and this causes some of the entrained material to bounce up over the wings 14 and onto the loose dry earth where it cannot germinate and where it is wasted.

The present device includes a vertically extending crease 25 formed in the rear wall of the tube 19 and extending from just above the nut and bolt assembly 20 to a point just above the mid-point between the upper and lower ends of tube 18. This crease extends from the rear wall thereof to a point just short of the axis of the tube and reference to FIG. 3 will show that the side junctions of the crease with the inner wall 26 of the tube are concavedly rounded as at 27 and that the inner apex 28 is convexedly rounded so that the inner surfaces of the tube are smooth and non-interfering with the material entrained within the airstream.

It will also be observed that the upper and lower ends of the crease indicated by reference characters 29, are also smoothly rounded so that the inner surfaces are concavedly curved as clearly shown.

Figure 2:
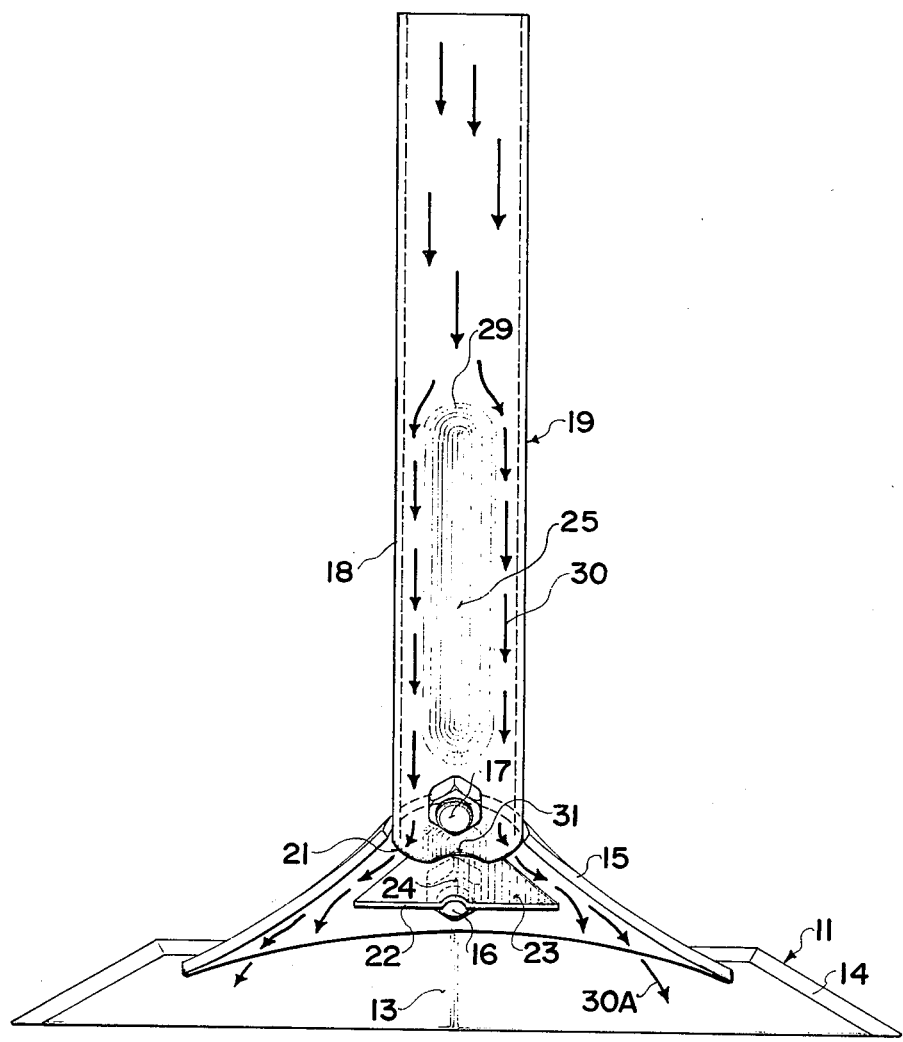
FIG. 2 is a rear view of FIG. 1.

The provision of this vertically extending crease divides the airstream and the material entrained thereby, into two substantially equal streams, one upon each side of the crease as indicated by arrows 30 in FIG. 2. These pass down either side of the vertically extending crease and therefore do not strike the bolt shank 20, but clear same and engage the outwardly and downwardly sloping side walls 23 of the saddle or splitter 22, partway down the sides thereof so that they are then deflected either onto the sides of the subsidiary wings 15 and are thus retained within the furrow, the boundaries of which are defined by the main wings 14. This is indicated by the arrows 30A in FIG. 2.

A further or secondary crease 31 is formed in the rear wall of the tube 18, below the nut and bolt assembly 17 and extends to the discharge end 21 and reference to FIG. 4 will show that the apex 32 while extending inwardly of the tube 18, terminates spaced farther from the vertical axis 33 than the apex 28 of the main vertical divider 25. Once again the inner surfaces of the walls of the tube and the crease together with the apex are smoothly rounded so that they do not interfere with the flow of the material. This lower crease ensures that the entrained material and the airstream carrying same remain divided until the splitter or saddle 22 is engaged thereby.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A seed and/or fertilizer applicating boot assembly for use in conjunction with a sweep secured to a downwardly depending sweep shank and including a securing bolt assembly extending diametrically through said tube from the front to the rear thereof and through the shank to secure said tube to said shank; comprising in combination substantially vertical tube operatively connected to a source of grain and/or fertilizer entrained in an air stream, means in said tube to divide the stream of grain and/or fertilizer into two streams, one at each side of the tube, said means extending along the vertical length of part of said tube, said means including a vertically extending crease formed in the wall of said tube extending inwardly therefrom partway across the bore of said tube, and extending from just above the securing bolt assembly to a point situated adjacent midway along the length of said tube.

2. The assembly according to claim 1 in which the vertical junction of the sides of the crease, with the wall of the tube are smoothly and concavedly curved internally, the apex of the crease being convexedly curved internally, the interior of the upper and lower ends of the crease being curved into the interior wall of the tube.

3. The assembly according to claim 1 which includes a further, lower crease formed in the rear wall of the tube and extending from the lower end thereof to adjacent to and just below said fastening bolt assembly, the apex of said further crease terminating closer to the rear wall of the tube than the apex of the first mentioned crease.

4. The assembly according to claim 1 in which said means extends from the rear wall thereof into the tube.

5. The assembly according to claim 4 in which the vertical junction of the sides of the crease, with the wall of the tube are smoothly and concavedly curved internally, the apex of the crease being convexedly curved internally, the interior of the upper and lower ends of the crease being curved into the interior wall of the tube.

6. The assembly according to claim 4 which includes a further, lower crease formed in the rear wall of the tube and extending from the lower end thereof to adjacent to and just below said fastening bolt assembly, the apex of said further crease terminating closer to the rear wall of the tube than the apex of the first mentioned crease.

7. The assembly according to claim 1 in which said vertically extending crease terminates short of the vertical axis of said tube.

8. The assembly according to claim 7 which includes a further, lower crease formed in the rear wall of the tube and extending from the lower end thereof to adjacent to and just below said fastening bolt assembly, the apex of said further crease terminating closer to the rear wall of the tube than the apex of the first mentioned crease.

9. The assembly according to claim 7 in which the vertical junction of the sides of the crease, with the wall of the tube are smoothly and concavedly curved internally, the apex of the crease being convexedly curved internally, the interior of the upper and lower ends of the crease being curved into the interior wall of the tube.

10. A sweep assembly secured to the lower end of a sweep shank comprising in combination a pair of wings extending outwardly from adjacent the lower end of said shank, means securing said sweep assembly to said shank, a seed and/or fertilizer boot assembly, bolt means securing same to the rear of said shank, said boot assembly terminating spaced above said sweep assembly, a dividing saddle secured to said shank immediately below the lower end of said boot assembly, said boot assembly including a substantially vertical tube operatively connected to a source of grain and/or fertilizer entrained in an airstream, means in said tube to divide the stream of grain and/or fertilizer into two streams, one at each side of the tube, said means extending along the vertical length of part of said tube, said means including a vertically extending crease formed in the wall of said tube extending inwardly therefrom partway across the bore of said tube, and extending from just above the securing bolt assembly to a point situated adjacent midway along the length of said tube.

11. The assembly according to claim 10 in which the vertical junction of the sides of the crease, with the wall of the tube are smoothly and concavedly curved internally, the apex of the crease being convexedly curved internally, the interior of the upper and lower ends of the crease being curved into the interior wall of the tube.

12. The assembly according to claim 10 which includes a further, lower crease formed in the rear wall of the tube and extending from the lower end thereof to adjacent to and just below said fastening bolt assembly, the apex of said further crease terminating closer to the rear wall of the tube than the apex of the first mentioned crease.

13. The assembly according to claim 10 in which said means extends from the rear wall thereof into the tube.

14. The assembly according to claim 13 in which the vertical junction of the sides of the crease, with the wall of the tube are smoothly and concavedly curved internally, the apex of the crease being convexedly curved internally, the interior of the upper and lower ends of the crease being curved into the interior wall of the tube.

15. The assembly according to claim 13 which includes a further, lower crease formed in the rear wall of the tube and extending from the lower end thereof to adjacent to and just below said fastening bolt assembly, the apex of said further crease terminating closer to the rear wall of the tube than the apex of the first mentioned crease.

16. The assembly according to claim 10 in which said vertically extending crease terminates short of the vertical axis of said tube.

17. The assembly according to claim 16 which includes a further, lower crease formed in the rear wall of the tube and extending from the lower end thereof to adjacent to and just below said fastening bolt assembly, the apex of said further crease terminating closer to the rear wall of the tube than the apex of the first mentioned crease.

18. The assembly according to claim 16 in which the vertical junction of the sides of the crease, with the wall of the tube are smoothly and concavedly curved internally, the apex of the crease being convexedly curved internally, the interior of the upper and lower ends of the crease being curved into the interior wall of the tube.

* * * * *